Patented Dec. 22, 1936

2,064,885

UNITED STATES PATENT OFFICE 2,064,885

PREPARATION OF POLY ALKYL-SUBSTITUTED PHENOLS

Marion Scott Carpenter, Nutley, N. J., assignor to Givaudan-Delawanna, Inc., New York, N. Y., a corporation of New York No Drawing. Application April 7, 1934, Serial No. 719,594

14 Claims. (Cl. 260—154)

The present invention concerns the preparation of poly alkyl substituted phenols. Many diversified processes have been devised for the manufacture of these substances, using a variety of condensing agents together with substances capable of furnishing the required alkyl groups such as alcohols, ethers, alkyl halides and hydrocarbons. In many processes high temperatures and high pressures have been resorted to in order to bring about reaction.

All such processes have, however, a common fault: They lead to a mixture of isomeric end products. In some instances these mixtures are difficult or impossible to separate; in other instances, while they may possibly be separated, the desired isomer is found in such small proportions as to make the process commercially impractical.

I have discovered that the relative proportions of the isomers formed can be controlled by suitable regulation of the reaction temperature.

I have also discovered that ethylene dichloride is an excellent solvent for these Friedel-Crafts reactions. It was not to be foreseen that this solvent would be suitable for such reactions with cresolic compounds, inasmuch as it reacts readily with aromatic hydrocarbons such as benzol under the influence of aluminum chloride to form compounds of the dibenzyl type. Carbon disulphide, a commonly used solvent for reactions of the present type, has the disadvantage that it frequently forms di-thio ethers having a disagreeable odor which is difficult to eliminate from the finished product; its high volatility and flammability are further disadvantages. Naphtha has the disadvantage that aluminum chloride addition compounds are difficultly soluble therein. Carbon tetrachloride frequently reacts with alkyl phenols and is therefore undesirable. Nitrobenzol and other high-boiling solvents are undesirable because they are more difficult to remove from the reaction mixture. Ethylene dichloride has none of these unfavorable properties. It is an excellent solvent for aluminum chloride complexes and thus affords a homogeneous reaction medium; its flammability is low and yet its boiling point is not too high; furthermore it is not corrosive to the ordinary commercial apparatus.

A striking illustration of the influence of temperature upon the formation of isomeric products is afforded by the case of m-cresol and isopropyl chloride. If these be allowed to react under the influence of aluminum chloride at a temperature of from 30° to 60° C. there results in nearly quantitative yield 3-methyl-5-isopropyl phenol. If the reaction temperature is maintained at —20° C. to 0° C. there results as the principal product of the reaction thymol, with only a small amount of the above symmetrical isomer as a by-product.

It has been found that it is desirable to use more than one equivalent of aluminum chloride based on the alkyl phenol because an alkyl phenol reacts with aluminum chloride in equimolecular proportions to form a salt of the type ROAlCl$_2$ $$ROH + AlCl_3 = HCl + ROAlCl_2$$

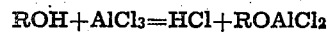

which salt in itself is not capable of reacting with alkyl halides unless additional aluminum chloride is present. While any additional amount is sufficient, it is preferred to use about 1½ molecular equivalents but the invention is not restricted to this proportion.

The reaction may be conducted at temperatures ranging from —20° C. to 60° C. or higher. The general method of procedure is to suspend more than one equivalent of aluminum chloride in a suitable inert solvent then add the selected alkyl phenol and the selected halide either together or successively, controlling the temperature as desired. To control the reaction, the alkyl halides may be diluted with the solvent. At the completion of the reaction the product is decomposed with ice in the customary manner, the solution washed free of acid and the solvent removed by distillation. The remaining product may be worked up in various ways: by direct distillation, by crystallization where feasible or by solution in caustic soda followed by extraction with naphtha, reprecipitation of the poly alkyl phenol and distillation or crystallization.

The following examples serve to illustrate the scope of the present invention:

Example 1

400 grams of aluminum chloride are suspended in 900 grams ethylene dichloride and 216 grams m-cresol are added, keeping the temperature at 15 to 20° C. by cooling. The whole is then cooled to —10° and 174 grams isopropyl chloride is added, keeping the temperature below —10°. When the reaction is completed the clear solution is decomposed in ice and worked up in the usual manner.

There is thus obtained 175 grams pure thymol melting at 50.5° C. and about 96 grams of a liquid isomeric product consisting principally of the product under Example 2 and having a boiling point of from 100° to 110° at 4 mm.

This material is soluble in all ordinary organic solvents and caustic alkali solvents, has antiseptic properties, and is also useful as an anti-oxidant for soaps, oils, fats, etc.

Example 2

400 grams aluminum chloride are suspended in 900 grams ethylene dichloride and 216 grams m-cresol are added, keeping the temperature at 15° to 20°. Then 174 grams isopropyl chloride is added at 25 to 30°. When the addition is complete the solution is warmed to 60° and held at that temperature for ½ hour.

On working up and distilling there is obtained 266 grams oil boiling at 105–110° at 4 mm. which quickly solidifies to a mass of crystals. On recrystallization colorless small needles are obtained melting at 49–50°. The product is an isomer of thymol: 3-methyl-5-iso-propyl phenol and is practically odorless.

This material is soluble in all ordinary organic solvents and caustic alkali solvents, has antiseptic properties, and is also useful as an anti-oxidant for soaps, oils, fats, etc.

Example 3

216 grams o-cresol is added to a suspension of 400 grams aluminum chloride in 900 grams ethylene dichloride. 174 grams iso-propyl chloride is introduced at a temperature of −15° and the reaction product worked up in the customary manner.

There is obtained 207 grams of carvacrol boiling at 94–96° at 4 mm. and 35 grams of an isomeric product, 2-methyl-3-iso-propyl phenol, appearing as odorless needles of M. P. 75°.

This novel material is soluble in all ordinary organic solvents and caustic alkali solvents, has antiseptic properties, and is also useful as an anti-oxidant for soaps, oils, fats, etc.

Example 4

216 grams p-cresol, 400 grams aluminum chloride and 1000 grams ethylene dichloride are treated with 174 grams iso-propyl chloride at −10° to 0° and the resulting solution decomposed and worked up as usual.

There is obtained 40–50 grams unchanged p-cresol, an intermediate fraction containing 2-iso-propyl-p-cresol, and about 100 grams 3-iso-propyl p-cresol, appearing after recrystallization from naphtha as slender needles of M. P. 94° having a faint odor reminding of thymol, and has a milder thymol-like odor and taste than 6-chlor-thymol which is in common use in mouth washes, toothpaste, etc.

This novel material is soluble in all ordinary organic solvents and caustic alkali solvents and has useful antiseptic properties.

Example 5

244 grams s-xylenol is added to a suspension of 400 grams aluminum chloride in 900 grams ethylene dichloride at 0° to 15°. The solution is then chilled to −14° and a solution of 174 grams isopropyl chloride in 200 grams of ethylene chloride is added at −14° to −10°. When the reaction is completed the solution is decomposed in ice, washed neutral, the solvent distilled off and the residue distilled at lower pressure.

17 grams unchanged s-xylenol is recovered, then there distills, at 95–100° at 4 mm. 247 grams of iso-propyl s-xylenol as a yellowish liquid of mild cresolic odor. It is soluble in all ordinary organic solvents and caustic alkali solvents and is novel material, and has useful antiseptic properties.

While I prefer ethylene dichloride, the process can also be carried out by tetrachlor ethane, carbon bisulphide and equivalent inert solvents, but ethylene dichloride is superior as hereinabove pointed out.

On account of the good yields and comparative purity obtained, the various products made by the process of this invention are very useful in the production of artificial resins.

The invention claimed is:

1. Process for the preparation of poly alkyl substituted phenols comprising reacting an alkyl substituted phenol and an alkyl halide with aluminum chloride suspended in an inert chlorinated hydrocarbon the amount of aluminum chloride being in excess of that required to react with all the alkyl substituted phenol.

2. Process for the preparation of poly alkyl substituted phenols comprising reacting an alkyl substituted phenol and an alkyl halide with aluminum chloride suspended in ethylene dichloride.

3. Process for the preparation of poly alkyl substituted phenols comprising reacting an alkyl substituted phenol and an alkyl halide with aluminum chloride suspended in tetrachlor ethane the amount of aluminum chloride being in excess of that required to react with all the alkyl substituted phenol.

4. Process for the preparation of poly alkyl substituted phenols comprising reacting an alkyl substituted phenol and an alkyl halide with a suspension of aluminum chloride the amount of aluminum chloride being in excess of that required to react with all the alkyl substituted phenol.

5. Process for the preparation of poly alkyl substituted phenols comprising reacting an alkyl substituted phenol and an alkyl halide with a suspension of aluminum chloride in ethylene dichloride the amount of aluminum chloride being in excess of that required to react with all the alkyl substituted phenol.

6. Process for the preparation of poly alkyl substituted phenols comprising reacting an alkyl substituted phenol and an alkyl halide with a suspension of aluminum chloride at a temperature between −20° C. and 60° C. the amount of aluminum chloride being in excess of that required to react with all the alkyl substituted phenol.

7. Process for the preparation of poly alkyl substituted phenols comprising reacting an alkyl substituted phenol and isopropyl chloride with a suspension of aluminum chloride in an inert halogenated hydrocarbon at a temperature between −20° C. and 60° C. the amount of aluminum chloride being in excess of that required to react with all the alkyl substituted phenol.

8. Process for the preparation of 2-methyl-3-iso-propyl phenol comprising reacting at a temperature between −20° C. and 60° C. o-cresol and isopropyl chloride with aluminum chloride suspended in an inert chlorinated hydrocarbon, the amount of aluminum chloride being in excess of that required to react with all the o-cresol and recovering 2-methyl-3-iso-propyl phenol.

9. Process for the preparation of 2-methyl-3-iso-propyl phenol comprising reacting at a temperature between −20° C. and 60° C. o-cresol and isopropyl chloride with aluminum chloride suspended in ethylene dichloride, the amount of aluminum chloride being in excess of that required to react with all the o-cresol and recovering 2-methyl-3-iso-propyl phenol.

10. Process for the preparation of 3-iso-propyl-p-cresol comprising reacting at a temperature between —20° C. and 60° C. p-cresol and isopropyl chloride with aluminum chloride suspended in an inert chlorinated hydrocarbon, the amount of aluminum chloride being in excess of that required to react with all the p-cresol and recovering 3-iso-propyl-p-cresol.

11. Process for the preparation of 3-iso-propyl-p-cresol comprising reacting at a temperature between —20° C. and 60° C. p-cresol and isopropyl chloride with aluminum chloride suspended in ethylene dichloride, the amount of aluminum chloride being in excess of that required to react with all the p-cresol and recovering 3-iso-propyl-p-cresol.

12. Process for the preparation of iso-propyl s-xylenol comprising reacting at a temperature between —20° C. and 60° C. s-xylenol and isopropyl chloride with aluminum chloride suspended in an inert chlorinated hydrocarbon, the amount of aluminum chloride being in excess of that required to react with all the s-xylenol and recovering iso-propyl s-xylenol.

13. Process for the preparation of iso-propyl s-xylenol comprising reacting at a temperature between —20° C. and 60° C. s-xylenol and isopropyl chloride with aluminum chloride suspended in ethylene dichloride, the amount of aluminum chloride being in excess of that required to react with all the s-xylenol and recovering iso-propyl s-xylenol.

14. 2-methyl-3-iso-propyl-phenol.

MARION SCOTT CARPENTER.

DISCLAIMER 2,064,885.—*Marion Scott Carpenter*, Nutley, N. J. PREPARATION OF POLY ALKYL-SUBSTITUTED PHENOLS. Patent dated December 22, 1936. Disclaimer filed January 8, 1944, by the assignee, *Givaudan-Delawanna, Inc.*

Hereby disclaims claims 8, 9, 10, 11, and 14 of said patent.

[*Official Gazette February 1, 1944.*]